March 28, 1967 L. HOWSON 3,311,714
METHOD AND APPARATUS FOR TESTING A REPEATERED TRANSMISSION PATH
Filed Dec. 20, 1963
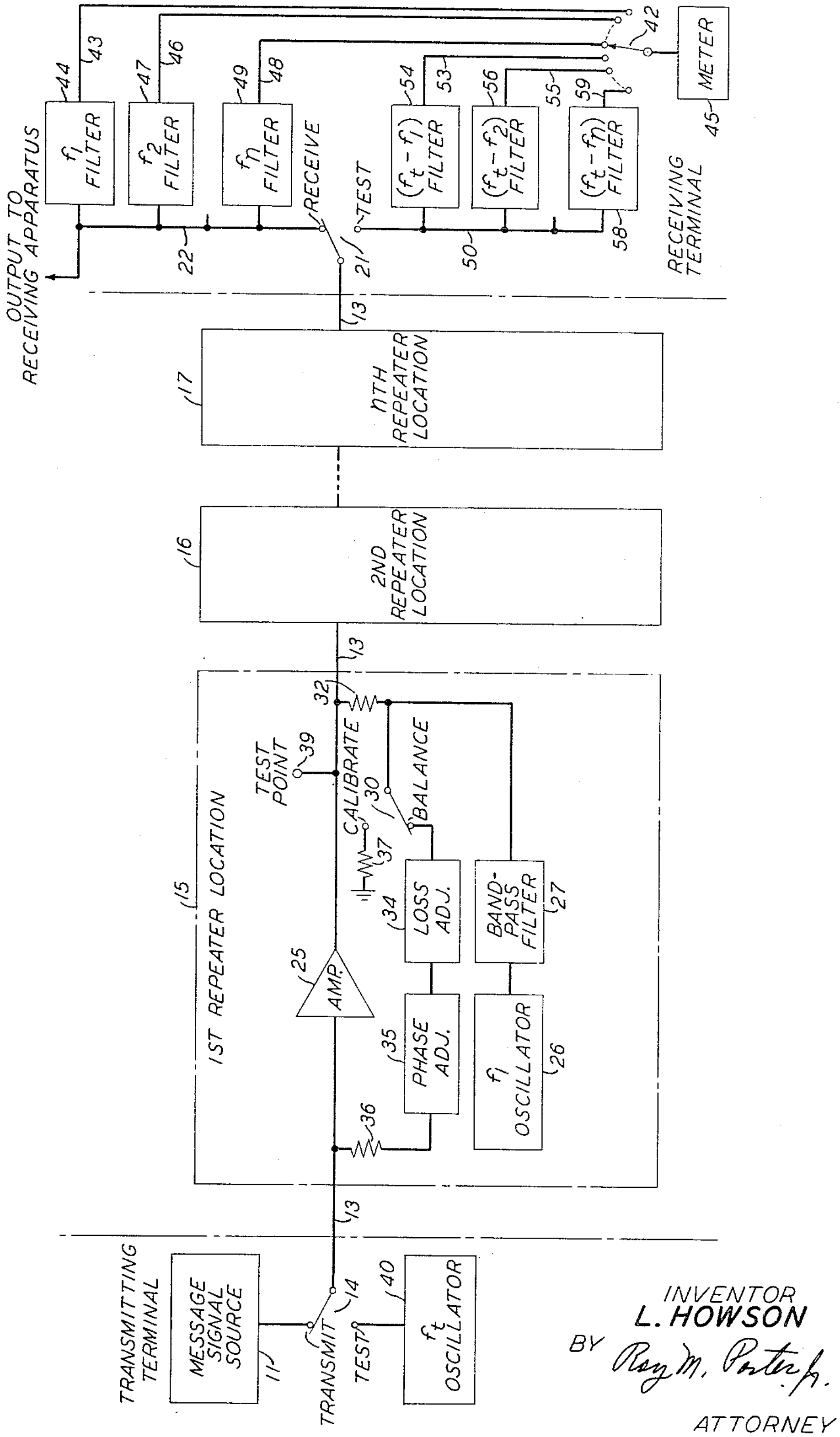
INVENTOR
L. HOWSON
BY Roy M. Porter, Jr.
ATTORNEY

United States Patent Office 3,311,714

Patented Mar. 28, 1967

3,311,714

METHOD AND APPARATUS FOR TESTING A REPEATERED TRANSMISSION PATH

Louis Howson, Berkeley Heights, N.J., assignor to Bell Telephone Laboratories, Incorporated, New York, N.Y., a corporation of New York Filed Dec. 20, 1963, Ser. No. 332,076

5 Claims. (Cl. 179—175.31)

This invention relates to communications systems using unattended repeating amplifiers and more particularly, although not exclusively, to apparatus for locating a faulty or inoperative one of a plurality of repeating amplifiers which are serially distributed over a transmission path.

An object of the invention is to facilitate supervision of a repeatered communication system.

Since these repeaters are quite often located at points which are accessible only with difficulty, it is a further object of the invention to locate a marginal or inoperative amplifier from a terminal of the transmission path.

It is a still further object of the invention to provide a method of and apparatus for measuring the gain and linearity of a remote amplifier.

In a principal aspect, the present invention takes the form of a repeater monitoring system capable of locating a faulty or inoperative repeater and measuring its operating characteristics. Each repeater is provided with an oscillator for generating a test tone having a frequency peculiar to and indicative of that repeater. In accordance with the invention, this locally generated test tone is applied through a first circuit path to the input of the repeating amplifier and through a second circuit path to the output of the amplifier, the transfer characteristics of these two paths being so proportioned that the component of the test tone which is delivered to the amplifier output through the second circuit path is substantially equal in magnitude to and 180 degrees out of phase with that component of the tone which passes to the output through the first circuit path and the amplifier. Means are employed in either the first or second of these paths for adjusting the phase and amplitude of one of the tone components to cause the two components to cancel at the output. Should the amplifier undergo a change in gain or phase shift, this initial balance will be destroyed and the tone is sent over the path to the receiving terminal. The amplitude of the test tone received from a given repeater thus provides a measure of the state of health of that repeater.

The high amplitude level of the test tone within the active amplifier coupled with its substantially complete suppression at the amplifier output further provides a distinct advantage with respect to measurements of the amplifier's linearity. In accordance with a further feature of the invention, a test tone may be transmitted down the repeatered transmission line from the transmitting terminal such that modulation products will be created at the sum and difference frequencies in each amplifier exhibiting nonlinear amplitude characteristics. Means are also provided at the receiving terminal of the transmission path for measuring the amplitude of these modulation products. Since the locally generated tone present within each amplifier is suppressed at the amplifier output, the generation of a modulation product from this tone in a subsequent repeater is prohibited.

In order to obtain a more complete understanding of the invention, reference should be made to the following detailed description and the attached drawing, the single figure of which illustrates an embodiment of the invention.

In the drawing, a message signal source 11 is connected to the transmission path 13 by means of the TRANSMIT-TEST switch 14. The transmission path 13 includes $n$ repeater locations 15, 16 and 17. Message signals originating in source 11 are applied to the message utilization apparatus by means of the RECEIVE-TEST switch 21 and conductor 22.

The circuitry included in each of the repeater locations 15 through 17 is essentially identical and is shown in detail only for the first repeater location 15. At location 15, a repeating amplifier 25 is connected in series with the transmission path 13. An oscillator 26, which generates a sinusoidal tone having a frequency $f_1$, is connected through a bandpass filter 27 and resistance 32 to the output of amplifier 25. Filter 27 eliminates harmonics or other spurious signals. The tone from oscillator 26 is also applied through the bandpass filter 27, BALANCE-CALIBRATE switch 30, a loss adjustment network 34, a phase adjustment network 35 and a resistance 36 to the input of amplifier 25. A resistance 37 is connected from switch 30 to ground.

At the time the amplifying apparatus is installed (or during subsequent supervisory visits to the repeater location), the tone injection arrangement is calibrated and balanced. With switch 30 in the upper, CALIBRATE position and with a test meter connected to measure the tone level at test point 39, the amplitude of the signal applied to the output of the amplifier 25 is adjusted to a predetermined level. The switch 30 is then moved to the lower, BALANCE position and both the loss adjusting network 34 and phase adjusting network 35 are varied until a null is created at the amplifier output. It should be noted that even though the injected test tone is not transmitted down the transmission line 13 to subsequent repeater locations, a substantial tone component does pass through the amplifier 25. The loss and phase adjustment apparatus may, of course, be placed between the oscillator and the amplifier output rather than between the oscillator and the input as shown.

The apparatus provided at the other repeater locations 16 and 17 differs from that at location 15 only in that the local oscillators generate different frequencies. At repeater location 16, the test tone injected through the amplifier and again cancelled at its output has the frequency $f_2$. At the $n$th repeater location 17, the locally generated test tone has the frequency $f_n$.

At the transmitting terminal an oscillator 40 is employed to generate a further test signal having the frequency $f_t$. The output of oscillator 40 is connected to the transmission path 13 by means of the switch 14 whenever that switch is in the TEST position.

At the receiving terminal a meter 45 is connected to the conductor 22 by means of a bandpass filter 44, conductor 43, and the selector switch 42. Bandpass filter 44 passes any signal having the frequency $f_1$ to the meter 45 such that the signal created by a change in gain or phase shift of the amplifier 25 at repeater location 15 may be measured. It should be noted here that the frequency $f_1$ may well be selected to lie outside the frequency bandpass of the message signals from source 11. A similar measuring arrangement for monitoring the operation of the repeater location 16 comprises the conductor 46 which is connected to conductor 22 by means of $f_2$ bandpass filter 47. The conductor 48 and the bandpass filter 49 are used to measure the amplitude of any signal having the frequency $f_n$ on conductor 22.

When the switch 21 at the receiving terminal is in the TEST position, the received signals appear on conductor 50. The meter 45, when connected to conductor 50 by means of the bandpass filter 54 and conductor 53, measures the amplitude of any signal component on conductor 50 which has the frequency $(f_t - f_1)$. When switch 14 is also in the TEST position, the test signal from oscillator 40 at the transmitting terminal is transmitted down the transmission path 13 to cause modulation products to be generated at any repeater location where the connected amplifier exhibits nonlinear amplitude characteristics. These modulation products, if formed at repeater location 15, have frequencies which are the sum of and the difference between $f_t$ and $f_1$. Only one of these modulation products need be measured at the receiving terminal to produce an indication of the linearity of amplifier 25. It should be noted that had it not been for the suppression of the locally generated tone $f_1$ at the output of amplifier 25, modulation products having the frequency $(f_t-f_1)$ would be generated in any subsequent nonlinear repeater.

Apparatus is provided in conjunction with the remaining repeater locations 16 and 17 for obtaining a measure of their linearity. Modulation products having the frequency $(f_t-f_2)$ which might be generated at the repeater location 16 pass through bandpass filter 56 to the meter 45 when switch 42 is properly positioned. Bandpass filter 58 is used to measure the amplitude of a modulation product which would be produced at the repeater location 17 in the event the interconnected amplifier exhibits a nonlinear amplitude gain characteristic.

The power level, $P_i$, of a modulation product received from the $i$th repeater may be expressed by the following relation:

$$P_i=K(F_iF_t)^2M_i+K(F_i'F_t)^2(M_{i+1}+M_{i+2}+ \dots +M_n)$$

where K is a constant of the system; $F_i$ and $F_t$ are the amplitudes of the locally generated signal and the testing signal from the transmitting end, respectively; $M_i$ is a measure of the nonlinearity of the $i$th repeater; and, $F_i'$ is a measure of the degree of balance achieved at the $i$th repeater (for complete cancellation, $F_i'=0$). In a practical system, balances in excess of 20 db are obtainable. Thus, the contribution produced by all amplifiers following the one of interest would be reduced by a factor of 100 and would produce negligible measurement error.

It is to be understood that the testing operations and the apparatus for supervising the operation of the repeater transmission path which have been described above, are merely illustrative of an application of the principles of the invention. Numerous other testing apparatus and procedures may be devised by those skilled in the art without departing from the true spirit and scope of the invention.

What is claimed is:

1. Apparatus for monitoring the operation of an amplifier which comprises, in combination, a source of a single frequency testing signal, a first circuit path for applying said signal to the input of said amplifier, a second circuit path for applying said signal to the output of said amplifier, means for adjusting the relative impedances of said first and said second circuit paths such that the signal passing to said output through said second circuit path is equal in amplitude to and 180° out of phase with the signal passing to said output through the combination of said first circuit path and said amplifier, and means for measuring the magnitude of any signal having said single frequency which appears at the output of said amplifier due to changes in the transfer gain of said amplifier.

2. Apparatus for monitoring the operation of an amplifier which comprises, in combination, a source of a single frequency testing signal, a first circuit path for applying said signal to the output of said amplifier, a second circuit path for applying said signal to the input of said amplifier, the transfer characteristics of said first and said second paths being so proportioned that the signal applied to said output through said first path is equal in amplitude to and out of phase with the signal applied to said output through the combination of said second path and said amplifier, and means for measuring the magnitude of any signal having said single frequency which appears at the output of said amplifier.

3. In combination, a transmission line which includes a plurality of serially connected amplifiers, means associated with at least one of said amplifiers for generating a first testing signal, a first circuit path for applying said first testing signal to the input of said amplifier, a second circuit path for applying said first testing signal to the output of said amplifier, means for varying the transfer impedance of at least one of said paths such that the signal applied to said output by way of said second path is equal in amplitude to and 180° out of phase with the signal applied to said output by way of the combination of said first path and said amplifier, a source of a second testing signal, means for applying said second testing signal to said transmission line such that said second signal passes through each of said amplifiers, and means at the receiving end of said transmission line for measuring the amplitude of a modulation product resulting from the mixing of said first and said second testing signals.

4. The method of testing a transmission path provided with a plurality of serially connected amplifiers which comprises, in combination, generating a first testing signal having a predetermined frequency, applying said testing signal to the input of a given one of said amplifiers, developing a second testing signal having said predetermined frequency, applying said second testing signal to the output of said one amplifier, adjusting the relative phase and amplitude of said first and said second testing signals to produce a null at the output of said one amplifier, and measuring the amplitude of any signal having said predetermined frequency at the receiving end of said terminal to detect changes in the gain or phase shift of said one amplifier.

5. The method of obtaining a measure of the linearity of a particular one of a plurality of amplifiers which are serially distributed along a transmission path which comprises, in combination, generating a first testing signal having a predetermined frequency, applying said first signal to the input of said one amplifier, developing a second testing signal having said predetermined frequency, applying said second signal to the output of said amplifier, adjusting the relative phase and amplitude of said first and said second signals to obtain a null at said output, generating at the transmitting end of said path a third signal, transmitting said third testing signal down said path, and measuring at the receiving end of said path a modulation product created by the mixing of said first and said third signals.

No references cited.

KATHLEEN H. CLAFFY, *Primary Examiner.*

A. McGILL, *Assistant Examiner.*